US012193009B2

(12) United States Patent
Xu et al.

(10) Patent No.: US 12,193,009 B2
(45) Date of Patent: Jan. 7, 2025

(54) INFORMATION TRANSMISSION METHOD AND DEVICE, COMPUTER EQUIPMENT AND STORAGE MEDIUM

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 435 days.

(21) Appl. No.: 17/588,118

(22) Filed: Jan. 28, 2022

(65) Prior Publication Data

US 2022/0167381 A1 May 26, 2022

Related U.S. Application Data

(63) Continuation of application No. PCT/CN2019/098719, filed on Jul. 31, 2019.

(51) Int. Cl.
*H04W 72/21* (2023.01)
*H04L 5/00* (2006.01)

(52) U.S. Cl.
CPC ........... *H04W 72/21* (2023.01); *H04L 5/0048* (2013.01)

(58) Field of Classification Search
None
See application file for complete search history.

(56) References Cited

U.S. PATENT DOCUMENTS

2019/0363843 A1* 11/2019 Gordaychik .............. H04L 1/08
2020/0029348 A1* 1/2020 Gao .......................... H04L 1/00
2021/0058948 A1 2/2021 Zhao

FOREIGN PATENT DOCUMENTS

CN 101159488 4/2008
CN 101873207 10/2010
CN 102098145 6/2011
CN 102215595 10/2011
CN 102263617 11/2011
CN 102412880 4/2012
CN 102571297 7/2012
CN 102892201 1/2013
(Continued)

OTHER PUBLICATIONS

WIPO, International Search Report and Written Opinion for PCT/CN2019/098719, Mar. 18, 2020.
(Continued)

*Primary Examiner* — Angela Nguyen
(74) *Attorney, Agent, or Firm* — Hodgson Russ LLP

(57) ABSTRACT

The present application relates to an information transmission method and device, a computer equipment and a storage medium. A terminal determines SR resources and PUSCH resources according to control signaling sent by a network side device; if the SR resources and the PUSCH resources are overlapped in time domain, and the SR resources and/or the PUSCH resources satisfy preset conditions, the SR information is multiplexed into the PUSCH resources. A specific method of sending SR is provided when the SR is overlapped with the PUSCH in time domain, thereby guaranteeing the SR transmission.

17 Claims, 5 Drawing Sheets

(56) References Cited

FOREIGN PATENT DOCUMENTS

| | | | |
|---|---|---|---|
| CN | 103002509 | | 3/2013 |
| CN | 103378961 | | 10/2013 |
| CN | 103384163 | | 11/2013 |
| CN | 103391166 | | 11/2013 |
| CN | 103580801 | | 2/2014 |
| CN | 103581094 | | 2/2014 |
| CN | 103581095 | | 2/2014 |
| CN | 103873212 | | 6/2014 |
| CN | 104009831 | | 8/2014 |
| CN | 104113402 | | 10/2014 |
| CN | 104378178 | | 2/2015 |
| CN | 106059726 | | 10/2016 |
| CN | 107294665 | | 10/2017 |
| CN | 107734653 | | 2/2018 |
| CN | 108347787 | | 7/2018 |
| CN | 108521885 | | 9/2018 |
| CN | 108632790 | | 10/2018 |
| CN | 109617664 | | 4/2019 |
| EP | 4000337 | A1 | 5/2022 |
| WO | 2019098697 | | 5/2019 |
| WO | 2019137502 | | 7/2019 |

OTHER PUBLICATIONS

CATT, "On UCI multiplexing on PUSCH, " 3GPP TSG RAN WG1 Meeting #93, R1-1806296, May 2018.
EPO, Extended European Search Report for EP Application No. 19939276.2, Aug. 12, 2022.

* cited by examiner

SR positive

SR negative

INFORMATION TRANSMISSION METHOD AND DEVICE, COMPUTER EQUIPMENT AND STORAGE MEDIUM

CROSS-REFERENCE

This application is a continuation of International Patent Application No. PCT/CN2019/098719, filed Jul. 31, 2019, the entire disclosure of which is incorporated herein by reference.

TECHNICAL FIELD

The present application relates to the field of communication, and more particularly, to an information transmission method and device, a computer apparatus and a storage medium.

BACKGROUND

In New Radio (NR), in order to reduce cross-modulation interference of an uplink transmission of a terminal device (User Equipment, UE), when transmissions of a physical uplink control channel (PUCCH) and a physical uplink shared channel (PUSCH) overlap in a time domain, two transmission modes, that is, discarding the PUSCH or multiplexing uplink control information (UCI) carried by the PUCCH onto the PUSCH, are supported.

In NR, flexibility in PUCCH and PUSCH structure designs results in their start symbols and end symbols being not necessarily aligned, respectively. In order to ensure that the UE has enough processing time to multiplex the UCI information with data information, there must be fixed timing requirements between the PUCCH and the PUSCH so that the UCI information carried by the PUCCH can be multiplexed onto the PUSCH, otherwise, the UE would discard the PUSCH.

Generally, for a single-slot PUCCH (non-repeated PUCCH), there are two timing requirements for PUCCH and PUSCH multiplexing as follows:

1) a time difference between a first OFDM symbol of the earliest transmitted channel of the PUCCH and PUSCH overlapped in the time domain and the last OFDM symbol of a PDSCH scheduled by DCI is longer than N1+1 OFDM symbols, where N1 is a capability of the UE to process the PDSCH reported by the UE. As shown in FIG. 1, the PUCCH and PUSCH overlap in the time domain, and the time difference between the first OFDM symbol of the earliest transmitted channel of the PUCCH and PUSCH and the last OFDM symbol of the PDSCH scheduled by the DCI is T1, and T1 should be greater than N1+1 OFDM symbols.

2) the time difference between the first OFDM symbol of the earliest transmitted channel of the PUCCH and PUSCH overlapped in the time domain and the last OFDM symbol of the latest DCI (DCI for scheduling the PUSCH or DCI for scheduling the PUCCH) is greater than N2+1 symbols, where N2 is time for the UE to prepare the PUSCH reported by the UE. As shown in FIG. 1, the PUCCH and PUSCH overlap in the time domain, and the time difference between the first OFDM symbol of the earliest transmitted channel of the PUCCH and PUSCH and the last OFDM symbol of the latest DCI is T2, and T2 should be greater than N2+1 symbols.

SUMMARY

In view of this, it is necessary to provide an information transmission method and device, a computer apparatus and a storage medium.

In a first aspect, embodiments of the present application provide an information transmission method, and the method includes:

determining, by a terminal, a scheduling request (SR) resource and a physical uplink shared channel (PUSCH) resource according to control signaling sent by a network-side device, wherein the SR resource is a physical uplink control channel (PUCCH) resource carrying SR information; and multiplexing the SR information onto the PUSCH resource if the SR resource and the PUSCH resource overlap in a time domain and the SR resource and/or the PUSCH resource satisfy a preset condition.

In a second aspect, the embodiments of the present application provide an information transmission method, and the method includes:

determining, by a network-side device, a SR resource and a PUSCH resource, wherein the SR resource is a PUCCH resource carrying SR information; and multiplexing the SR information onto the PUSCH resource if the SR resource and the PUSCH resource overlap in a time domain and the SR resource and/or the PUSCH resource satisfy a preset condition.

In one of the embodiments, the preset condition includes a multiplexing rule configured by the network-side device or a preset multiplexing rule.

In one of the embodiments, the multiplexing rule configured by the network-side device includes that:

the terminal has received semi-persistent signaling sent by the network-side device, wherein the semi-persistent signaling is used to indicate the terminal to multiplex the SR information onto the PUSCH resource.

In one of the embodiments, the preset multiplexing rule includes at least one of the following:

a transmission priority of the SR resource and the PUSCH resource satisfies a preset priority condition;

the SR resource satisfies a transmission priority requirement, and a length of the PUSCH resource is less than a preset threshold;

the SR resource satisfies the transmission priority requirement, and an end position of the PUSCH resource is at or before a preset position; and transmission configuration of the SR resource and transmission configuration of the PUSCH resource satisfy a preset configuration condition.

In one of the embodiments, the method further includes: discarding the SR and transmitting data on the PUSCH resource if the SR resource and/or the PUSCH resource do not satisfy the preset condition.

In one of the embodiments, the multiplexing the SR information onto the PUSCH resource includes:

transmitting the SR information on the PUSCH resource, wherein the SR information is carried by bits of a preset length.

In one of the embodiments, the preset length is a length determined according to the number of target SR configurations.

In one of the embodiments, the preset length being the length determined according to the number of the target SR configurations includes:

N=log 2(M+1), or N=M; where N is the preset length, and M is the number of the target SR configurations.

In one of the embodiments, the number of the target SR configurations is any of the following cases:

the number of the target SR configurations is a total number of SR configurations;

the number of the target SR configurations is the number of SR configurations that overlap with an entire PUSCH resource; and the number of the target SR configurations is the number of SR configurations that overlap with part of the PUSCH resource.

In one of the embodiments, the part of the PUSCH resource is a first half of the PUSCH resource.

In one of the embodiments, the part of the PUSCH resource is a resource for uplink control information (UCI) multiplexing.

In one of the embodiments, the multiplexing the SR information onto the PUSCH resource includes: transmitting the SR information on the SR resource and stopping transmission of data at a position on the PUSCH resource corresponding to the SR resource, if a SR state is a first state; and normally transmitting the data at the position on the PUSCH resource corresponding to the SR resource if the SR state is a second state.

In one of the embodiments, the SR resource and the PUSCH resource overlapping in the time domain is that the SR resource and a demodulation reference signal (DMRS) of the PUSCH resource overlap in the time domain, and the multiplexing the SR information onto the PUSCH resource includes at least one of the following methods:

sending the DMRS of the PUSCH resource without sending the SR, wherein the DMRS does not contain the SR information;

sending the DMRS of the PUSCH resource without sending the SR, wherein the DMRS contains the SR information;

sending the DMRS of the PUSCH resource, and postponing sending of the SR according to a preset number of symbols; and not sending the DMRS of the PUSCH resource, and sending the SR.

In one of the embodiments, the multiplexing the SR information onto the PUSCH resource includes: sending the SR information on the PUSCH resource if a SR state is a first state; and normally transmitting the data on the PUSCH resource if the SR state is a second state.

In one of the embodiments, the SR information is carried by any one of an SR sequence, a DMRS sequence, a specific modulation symbol, and a coded modulation code.

In one of the embodiments, a power control strategy of the SR information includes any one of the following strategies: a SR power control strategy; a PUSCH power control strategy; and determining a power compensation parameter according to a resource ratio between a frequency domain resource of a SR sent on the PUSCH resource and a frequency domain resource of an initial SR, and performing compensation on the PUSCH power control strategy or the SR power control strategy according to the power compensation parameter.

In one of the embodiments, the SR resource and the PUSCH resource overlapping in the time domain is that the SR resource and the DMRS of the PUSCH resource overlap in the time domain, and the sending the SR information on the PUSCH resource includes: sending the SR information at a position of the DMRS of the PUSCH resource.

In one of the embodiments, the multiplexing the SR information onto the PUSCH resource includes: transmitting the SR information on all preconfigured SR resources, and stopping transmitting data at positions on the PUSCH resource corresponding to the SR resources.

In one of the embodiments, the multiplexing the SR information onto the PUSCH resource includes: sending the SR information at all positions on the PUSCH resource that overlap with the SR resource.

In one of the embodiments, the multiplexing the SR information onto the PUSCH resource includes: carrying the SR information in the DMRS of the PUSCH.

In one of the embodiments, the carrying the SR in the DMRS of the PUSCH includes: using different DMRS configurations to indicate different SR states.

In one of the embodiments, the DMRS configuration includes at least one of a DMRS port, a DMRS sequence, and a DMRS pattern.

In one of the embodiments, different DMRS sequences are generated in the same manner, and different DMRS sequences have different initialization factors.

In one of the embodiments, different DMRS patterns have different time-frequency positions.

In one of the embodiments, the different DMRS configurations include: all DMRS configurations in the PUSCH resource are changed; or, part of DMRS configurations in the PUSCH resource are changed.

In an embodiment of the second aspect, the method further includes: blindly detecting, by the network-side device, the SR state.

In a third aspect, the embodiments of the present application provide an information transmission device, including:

a determining module, configured to determine a scheduling request (SR) resource and a physical uplink shared channel (PUSCH) resource according to control signaling sent by a network-side device, wherein the SR resource is a physical uplink control channel (PUCCH) resource carrying SR information; and a multiplexing module, configured to multiplex the SR information onto the PUSCH resource if the SR resource and the PUSCH resource overlap in a time domain and the SR resource and/or the PUSCH resource satisfy a preset condition.

In a fourth aspect, the embodiments of the present application provide an information transmission device, including:

a determining module, configured to determine a SR resource and a PUSCH resource, wherein the SR resource is a PUCCH resource carrying SR information; and a multiplexing module, configured to multiplex the SR information onto the PUSCH resource if the SR resource and the PUSCH resource overlap in a time domain and the SR resource and/or the PUSCH resource satisfy a preset condition.

In a fifth aspect, the embodiments of the present application provide a computer apparatus, including a memory and a processor, wherein the memory stores a computer program, and the processor carries out steps of the method of any one of the first aspect or the second aspect when executing the computer program.

In a sixth aspect, the embodiments of the present application provide a computer-readable storage medium having a computer program stored thereon, wherein the computer program, when being executed by a processor, carries out steps of the method of any one of the first aspect or the second aspect.

DETAILED DESCRIPTION

In order to make objectives, technical solutions, and advantages of the present application clearer, the present application will be further described in detail with reference to accompanying drawings and embodiments. It should be understood that specific embodiments described herein are only used to explain the present application, and are not used to limit the present application.

Figure 2:
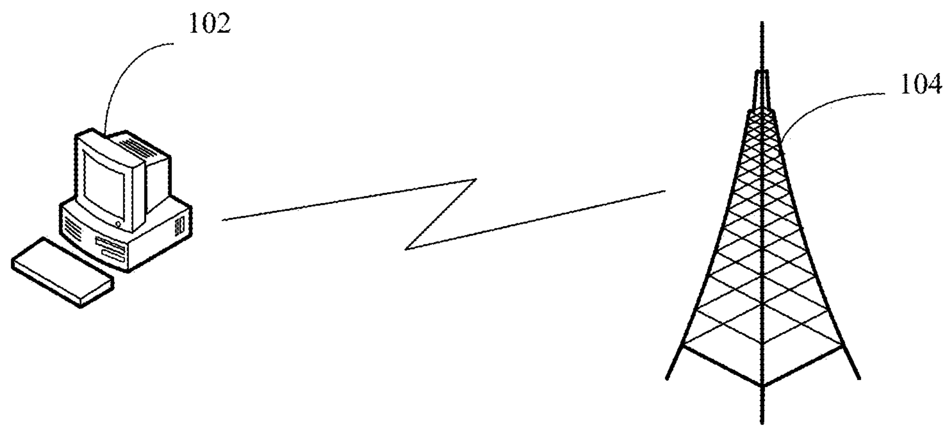
FIG. 2 is a schematic diagram of an application scenario of an information transmission method provided by an embodiment of the present application.

FIG. 2 is a schematic diagram of an application scenario of an information transmission method provided by an embodiment of the present application. As shown in FIG. 2, this scenario includes a terminal 102 and a network-side device 104. The terminal 102 communicates with the network-side device 104 through a network. For example, the network-side device 104 can send a control signaling to the terminal 102, and the terminal 102 determines a transmission resource based on the control signaling and thus transmits data. The terminal 102 may be, but is not limited to, various personal computers, notebook computers, smart phones, tablet computers, and portable wearable devices, and the network-side device 104 may be a base station.

Figure 1:
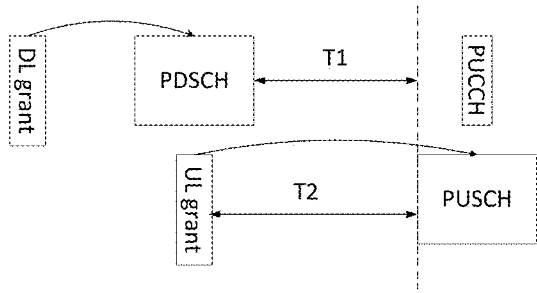
FIG. 1 is a schematic diagram of a timing relationship of PUCCH and PUSCH multiplexing provided by an embodiment.

In the prior art, transmission of a SR multiplexed to a PUSCH is not supported. The reason is that the PUSCH carries buffer state report (BSR) information which not only plays the role of a resource request, but also contains information on a quantity of scheduling requests, and thus it is not necessary to additionally send the SR. However, for ultra-reliable low latency (URLLC) services, if the SR is multiplexed into a long PUSCH, as shown in FIG. 1, a transmission period of the PUSCH is much longer than that of the PUCCH, and the SR can be parsed only when the entire PUSCH is received, leading to prolonging SR time and bringing transmission delay, and even being unable to satisfy service transmission requirements. Therefore, a design idea of also sending the SR when the SR and the PUSCH overlap in the time domain is proposed, but a specific sending method of SR is still unclear at present.

An information transmission method provided in the embodiments of the present application can solve the technical problem that multiplexing the SR into the long PUSCH in the prior art may prolong the SR time and bring the transmission delay, and even be unable to satisfy the service transmission requirements, but the present application is not limited to solving this technical problem, and can also solve other technical problems. For example, in the prior art, the SR is information that is not sure to be transmitted, and as a result, when the SR is multiplexed into the PUSCH, the number of UCI bits is uncertain, which leads to that the PUSCH and SR cannot be detected correctly by the network. For another example, in the prior art, timing requirement calculation needs to refer to PDSCH detection time (N1), PUSCH preparation time, CSI processing time, etc., but the SR generation process is inconsistent with the foregoing process, and therefore direct reference cannot be made. For still another example, in the prior art, only the SR transmission that satisfies the timing requirement can be solved, and the SR that does not satisfy the timing requirement cannot be sent normally, which may also cause delay in uplink scheduling. The present application is not limited to this.

Figure 3A:
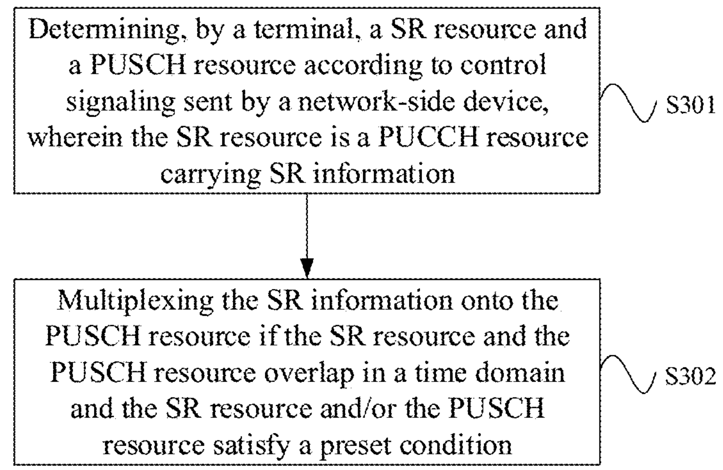
FIG. 3A is a flowchart of an information transmission method provided by an embodiment of the present application.

FIG. 3A is a flowchart of an information transmission method provided by an embodiment of the present application, and a performing subject of this method is a terminal. As shown in FIG. 3A, the method may include the following steps.

In S301, the terminal determines a SR resource and a PUSCH resource according to control signaling sent by a network-side device; where the SR resource is a PUCCH resource that carries SR information.

The SR resource is a time-frequency resource for transmitting the SR information, and the SR information is specific content of the SR.

In this embodiment, the network-side device can configure SR and PUSCH transmission resources for the terminal through the control signaling in advance. After receiving the control signaling, the terminal determines the PUCCH resource for carrying the SR information and the PUSCH resource for transmitting data.

In this embodiment, the terminal can determine the SR resource and the PUSCH resource in different ways, and different control signalings correspond to different determining ways. Optionally, the control signaling includes at least one of an uplink scheduling signaling, a semi-persistent signaling, and a DCI trigger signaling. Optionally, the SR resource is a resource determined by the terminal according to the semi-persistent signaling. Optionally, the PUSCH resource is a resource determined by the terminal according to the uplink scheduling signaling; alternatively, the PUSCH resource is a resource determined by the terminal according to the semi-persistent signaling and the DCI trigger signaling.

For example, the terminal receives an uplink scheduling (UL grant) signaling sent by the network-side device, which is used to schedule the uplink data PUSCH (indicating the PUSCH resource), and the terminal determines the PUSCH resource based on the UL grant. Alternatively, the terminal may also receive the semi-persistent signaling and corresponding DCI trigger signaling sent by the network side to determine the PUSCH resource. The semi-persistent signaling can be a scheduling configuration (Configured Grant Config) and a semi-persistent scheduling configuration (Semi-Persistent Scheduling Config, SPS-Config), the DCI trigger signaling can be DCI of a radio network temporary identifier (Configured scheduling-Radio Network Temporary Identifier, CS-RNTI) scrambled cyclic redundancy check (CRC). The terminal receives the semi-persistent signaling sent by the network-side device to determine the PUCCH resource that carries the SR.

In S302, if the SR resource and the PUSCH resource overlap in a time domain, and the SR resource and/or the PUSCH resource satisfy a preset condition, the SR information is multiplexed onto the PUSCH resource.

Figure 3B:
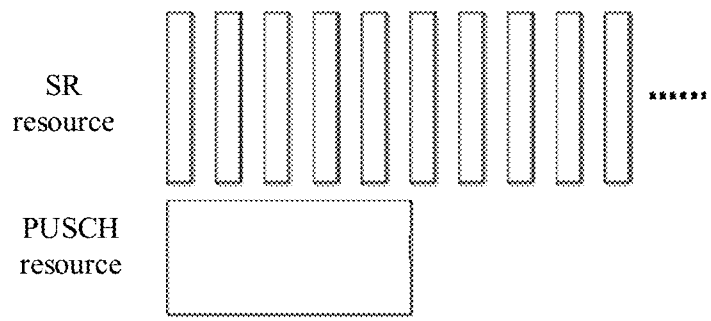
FIG. 3B is a schematic diagram of overlapping of a SR resource and a PUSCH resource in a time domain provided by an embodiment.

The overlapping includes a partial overlapping or a complete overlapping. As shown in FIG. 3B, the PUSCH resource of one period completely contains the SR resource of one period, which belongs to the complete overlapping case. The preset condition is used to indicate whether to multiplex the SR onto the PSUCH resource or not, and the preset condition may be agreed upon by the protocol or configured by the network.

In this embodiment, after determining the SR resource and the PUSCH resource according to the control signaling, the terminal can determine whether the SR resource and the PUSCH resource overlap in the time domain. When determining that the SR resource and the PUSCH resource overlap in the time domain, the terminal determines whether the SR resource and/or the PUSCH resource satisfy the preset condition, and if so, the SR information is multiplexed onto the PUSCH resource. For example, the network-side device sends the semi-persistent signaling to the terminal to indicate the terminal to multiplex the SR information onto the PUSCH resource; alternatively, a transmission priority of the SR is higher than a transmission priority of the PUSCH, etc., it can be determined that the SR resource and/or PUSCH resource satisfy the preset condition, and the terminal multiplexes the SR information onto the PUSCH resource for transmission. There are also multiple ways to multiplex the SR information onto the PUSCH resource, for example, sending the SR on the SR resource, and puncturing at a corresponding position of the PUSCH without transmitting the data; or, inserting the SR onto the PUSCH resource for transmission; or, only sending the SR at an overlapping time domain position without sending the PUSCH, etc., which are not limited in this embodiment, and the protocol agreement or network configuration can be set according to actual needs so as to determine a matching transmission mode.

In the information transmission method provided in this embodiment, the terminal determines the SR resource and the PUSCH resource according to the control signaling sent by the network-side device, and if the SR resource and the PUSCH resource overlap in the time domain, and the SR resource and/or the PUSCH resource satisfy the preset condition, the SR information is multiplexed onto the PUSCH resource, which provides a specific method for sending the SR when the SR overlaps with the PUSCH in the time domain, thereby ensuring the SR transmission.

Figure 4:
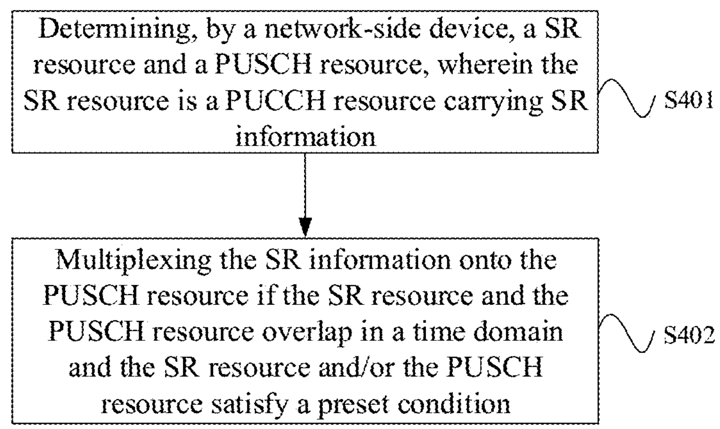
FIG. 4 is a flowchart of an information transmission method provided by an embodiment of the present application.

FIG. 4 is a flowchart of an information transmission method provided by an embodiment of the present application, and an performing subject of this method is a network-side device. As shown in FIG. 4, the method may include the following steps.

In S401, the network-side device determines a SR resource and a PUSCH resource; where the SR resource is a PUCCH resource that carries SR information.

In S402, if the SR resource and the PUSCH resource overlap in a time domain, and the SR resource and/or the PUSCH resource satisfy a preset condition, the SR information is multiplexed onto the PUSCH resource.

For an implementation principle and beneficial effects of the information transmission method provided in this embodiment, reference may be made to the embodiment described in FIG. 3A, which will not be repeated here.

On the basis of the embodiments shown in FIGS. 3 and 4, the preset condition includes a configured multiplexing rule by the network-side device or a preset multiplexing rule. The configured multiplexing rule by the network-side device is a multiplexing rule configured by the network-side, and the network-side device needs to send the multiplexing rule to the terminal; and the preset multiplexing rule is a multiplexing rule agreed upon by the terminal and the network-side device in advance, and there is no need for the network-side device to send the multiplexing rule to the terminal.

Optionally, the configured multiplexing rule by the network-side device includes that: the terminal receives a semi-persistent signaling sent by the network-side device, and the semi-persistent signaling is used to indicate the terminal to multiplex the SR information onto the PUSCH resource. For example, when the terminal receives the semi-persistent signaling sent by the network-side device, which is, for example, used to show simultaneous sending of the SR and the PUSCH, the SR is multiplexed into the PUSCH, otherwise, only the PUSCH is always sent.

Optionally, the preset multiplexing rule includes at least one of the following:

a transmission priority of the SR resource and the PUSCH resource satisfies a preset priority condition;

the SR resource satisfies a transmission priority requirement, and a length of the PUSCH resource is less than a preset threshold;

the SR resource satisfies the transmission priority requirement, and an end position of the PUSCH resource is at or before a preset position; and a transmission configuration of the SR resource and a transmission configuration of the PUSCH resource satisfy a preset configuration condition.

For example, when the transmission priorities of the SR and PUSCH satisfy a certain condition, the SR is multiplexed into the PUSCH, otherwise, the PUSCH is always sent. A typical example is that SR is a resource request used for a high-priority service (for example, URLLC), and PUSCH is used for enhanced mobile broadband (eMBB) service transmission, the transmission priority of the SR is higher than that of the PUSCH, and the SR is multiplexed into the PUSCH. For another example, when the SR satisfies the transmission priority requirement and the length of PUSCH is less than the preset threshold, or the end position of the PUSCH is at or before a preset third symbol, the SR is multiplexed into the PUSCH, otherwise, only the PUSCH is always sent. For still another example, if the SR transmission configuration (such as a period) and the PUSCH transmission configuration (such as a time domain length) satisfy a certain condition, the SR is multiplexed into the PUSCH, otherwise, only the PUSCH is always sent.

Further, the above method may further include: discarding the SR and transmitting data on the PUSCH resource if the SR resource and/or the PUSCH resource do not satisfy the preset condition. For example, when the SR resource and/or the PUSCH resource do not satisfy all the conditions mentioned above, the terminal always sends only the PUSCH.

In the information transmission method provided in this embodiment, when the SR resource and/or the PUSCH resource satisfy the preset condition, the SR information is multiplexed onto PUSCH resource. When the SR resource and/or the PUSCH resource do not satisfy the preset condition, only the PUSCH is always sent without sending the SR. By configuring different preset conditions, the SR can be accurately multiplexed onto the PUSCH resource in different scenarios.

Specific implementations of multiplexing the SR information onto the PUSCH resource will be described in detail below through multiple embodiments.

Embodiment 1

When the protocol agrees or the network side configures that the SR and the PUSCH can be multiplexed for transmission, bits are always reserved on the PUSCH for carrying the SR.

In one of the embodiments, multiplexing the SR information onto the PUSCH resource includes: transmitting the SR information on the PUSCH resource, and the SR information is carried by bits with a preset length. Optionally, the preset length is a length determined according to the number of target SR configurations. Further, the preset length being the length determined according to the number of the target SR configurations includes: N=log 2(M+1), or N=M; where N is the preset length, and M is the number of the target SR configurations.

In this embodiment, when the protocol agrees or the network side configures that the SR and the PUSCH can be multiplexed for transmission, the bits with the preset length are reserved on the PUSCH resource for carrying the SR information. Since the network side does not know when an uplink service comes from the terminal, it is difficult for the terminal and the network side to determine a unified SR generation starting point (usually, the SR generation starting point is a time point when the uplink service arrives) and the timing calculation. Moreover, a SR state on each configured SR resource is also unknown. Therefore, it is preferable to use the semi-persistent method for multiplexing the SR to the PUSCH, that is, the bits of the preset length are reserved on the PUSCH resource, which can reduce the misunderstanding of the terminal and the network side.

Specifically, the bits with the preset length N are related to the number M of overlapped SR configurations. One way is: N=log 2(M+1), which can indicate a SR configuration, and the SR configuration refers to how many sets of SR are configured, for example, when M=8, N=log 2(8+1)=3, and then the bits with a length of 3 can indicate one SR configuration. An advantage of this way is that signaling overhead is small, and it is suitable for a case where only one SR state is transmitted to a physical layer by a high level layer. Another way is: N=M, which can indicate at least one or even multiple SR configurations, for example, when M=8, N=8, and then the bits with a length of 3 can indicate multiple SR configurations. An advantage of this way is that the combinations of all SR states can be indicated fully, and it is suitable for a case where multiple SR states are transmitted to the physical layer by the high level layer.

Further, the number of the target SR configurations is any of the following cases:

the number of the target SR configurations is a total number of SR configurations;

the number of the target SR configurations is the number of SR configurations that overlap with an entire PUSCH resource; and the number of the target SR configurations is the number of SR configurations that overlap with part of the PUSCH resource.

The part of the PUSCH resource is a first half of the PUSCH resource, or the part of the PUSCH resource is a resource for UCI multiplexing. The part of the PUSCH resource may be a resource agreed by the protocol, or a resource configured by the high level signaling.

Figure 5:
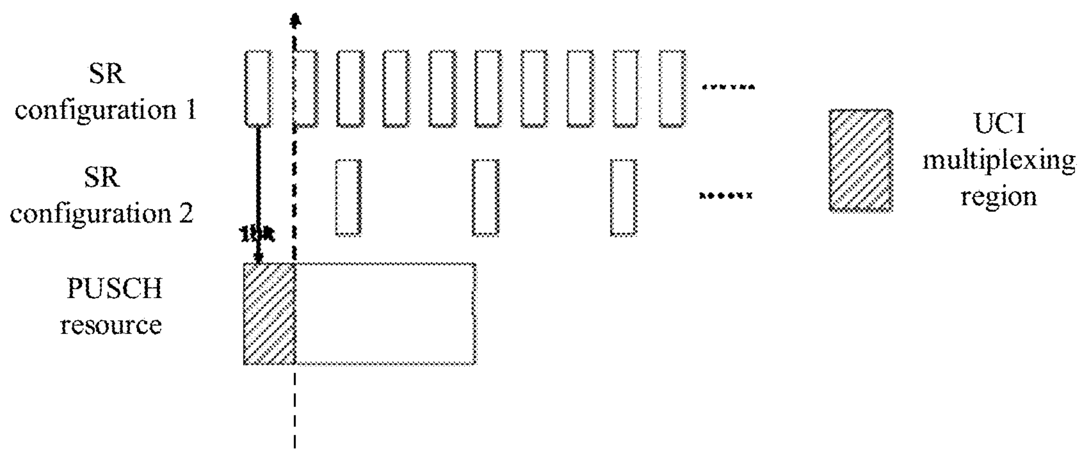
FIG. 5 is a schematic diagram of overlapping of a SR resource and a PUSCH resource in a time domain provided by another embodiment.

In this embodiment, a rule for determining the number of the target SR configurations can be, but is not limited to, any of the following methods: 1) the number of the target SR configurations is the total number of the SR configurations, and an advantage of this method is that the number of bits for multiplexing is constant and the implementation is simple. 2) the number of the target SR configurations is the number of SR configurations that overlap with an entire PUSCH resource, and an advantage of this method is that the number of bits for multiplexing of the SR can be accurately matched, thereby reducing the multiplexing overhead, and ensuring the reliable PUSCH transmission. 3) the number of the target SR configurations is the number of SR configurations that overlap with part of the PUSCH resource, and the part of the PUSCH resource is a first half of the PUSCH resource, an example of which is that a region of the part of the PUSCH resource is a time domain region for UCI multiplexing, and the region for UCI multiplexing can be configured by the high level layer or agreed upon by the protocol. An advantage of this method is that the number of bits for multiplexing of the SR can be accurately matched, and since the SR configuration beyond the time domain region for UCI multiplexing can no longer be multiplexed in the PUSCH, there is no need to reserve bits. As shown in FIG. 5, in the UCI multiplexing region, only the SR configuration overlaps with the PUSCH, then the terminal multiplexes 1 bit into the PUSCH. The value of the 1 bit depends on the SR state. For example, if the SR is positive, then the value of the 1 bit is set to "1", otherwise, the value of the 1 bit is set to "0".

Embodiment 2 the SR information is multiplexed onto the PUSCH resource by means of a puncturing transmission.

Method 1: a puncturing configuration is predefined, and the SR information is sent on the SR resource.

In one of the embodiments, multiplexing the SR information onto the PUSCH resource includes:

transmitting the SR information on the SR resource and stopping transmitting data at a position on the PUSCH resource corresponding to the SR resource if a SR state is a first state; and normally transmitting the data at the position on the PUSCH resource corresponding to the SR resource if the SR state is a second state.

The position on the PUSCH resource corresponding to the SR resource refers to a position where the PUSCH resource and the SR resource overlap in the time domain and the SR state is the first state. The first state can be positive, or can be yes, true, 1, etc., and the second state can be negative, or can be no, false, 0, etc., which is not limited in this embodiment.

Figure 6:
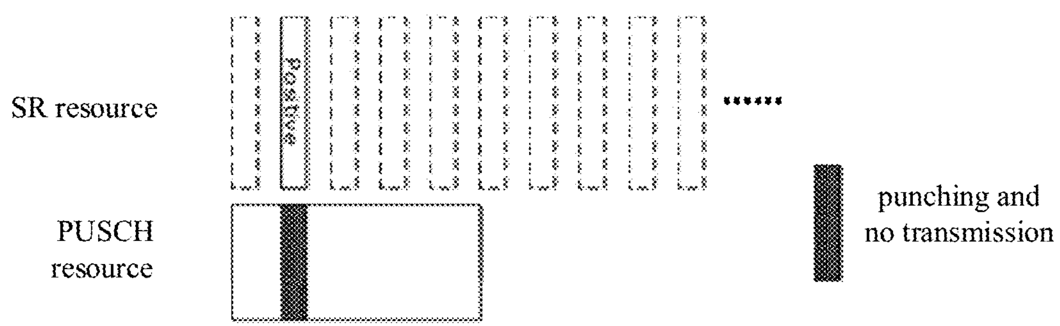
FIG. 6 is a schematic diagram of multiplexing a SR onto a PUSCH resource provided by an embodiment.

In this embodiment, as shown in FIG. 6, when the SR state is positive, the SR information is sent on the SR resource and the PUSCH transmission is stopped, that is, the position on the PUSCH resource corresponding to the SR resource whose SR state is positive is punctured and no data is transmitted; when the SR state is negative, the PUSCH is sent normally. The advantage of this method is that the SR is sent on the predefined resource, which is predictable for the base station, and the base station performs blind detection at limited positions, which reduces the complexity of the base station. The SR is sent on the SR resource, and the existing technologies can be absolutely adopted without additional new standardization work. It should be noted that sending the SR includes a method for sending the SR and the SR information. The method for sending the SR can be "sending the SR information on the SR resource", "inserting the SR information on the PUSCH resource for transmission", "carrying the SR information through the DMRS of the PUSCH resource", and so on. The SR information is specific content of the SR.

Further, the SR resource and the PUSCH resource overlapping in the time domain is that the SR resource and a demodulation reference signal (DMRS) of the PUSCH resource overlap in the time domain, and multiplexing the SR information onto the PUSCH resource includes at least one of the following methods:

sending the DMRS of the PUSCH resource without sending the SR, where the DMRS does not contain the SR information;

sending the DMRS of the PUSCH resource without sending the SR, where the DMRS contains the SR information;

sending the DMRS of the PUSCH resource, and postponing sending the SR according to a preset number of symbols; and not sending the DMRS of the PUSCH resource, and sending the SR.

In this embodiment, when the SR resource and the PUSCH DMRS overlap in the time domain, one or more of the following methods can be adopted: 1) only the PUSCH DMRS is sent, and the SR is not sent, and the DMRS does not contain the SR information, that is, a preset DMRS configuration is adopted, and the technical advantage is that the processing process is simple. 2) Only the PUSCH DMRS is sent, but the DMRS contains the SR information, for example, different DMRS sequences or ports correspond to different SR states, and the technical advantage is that all information can be sent without adding additional resources. 3) Only the PUSCH DMRS is sent, and the sending of the SR is postponed. The number of postponed symbols can be agreed upon by the protocol or configured by the network, and the technical advantage is that all information can be sent. 4) Only the SR is sent, and the technical advantage is simplicity. 5) For front-loaded DMRS and additional DMRS, a combination of the above methods is adopted. For example, for the front-loaded DMRS, the method in which the DMRS of the PUSCH resource is sent, the SR is not sent and the DMRS does not contain the SR is adopted, and for the additional DMRS, the method in which the DMRS of the PUSCH resource is not sent and the SR is sent is adopted; alternatively, for the front-loaded DMRS, the method in which the DMRS of the PUSCH resource is sent, the SR is not sent and the DMRS does not contain the SR is adopted, and for the additional DMRS, the method in which the DMRS of the PUSCH resource is sent, the SR is not sent, and the DMRS contains the SR is adopted. The two types of DMRS can be treated differently based on the importance of the two types of DMRS to improve system efficiency Method 2: the puncturing configuration is predefined, and the SR is sent on the PUSCH resource.

In one of the embodiments, multiplexing the SR information onto the PUSCH resource includes:

sending the SR information on the PUSCH resource if a SR state is a first state; and normally transmitting the data on the PUSCH resource if the SR state is a second state.

Figure 7:
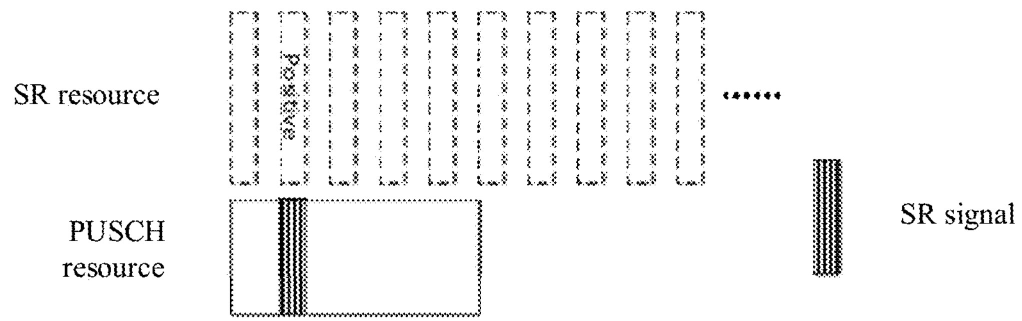
FIG. 7 is another schematic diagram of multiplexing a SR onto a PUSCH resource provided by an embodiment.

In this embodiment, as shown in FIG. 7, when the SR state is positive, the SR information is sent on the PUSCH resource; when the SR state is negative, the PUSCH is sent normally, that is, the position on the PUSCH resource corresponding to the positive SR state is punched, and the punched position is used to transmit the SR. The technical advantage is that a frequency domain position for sending the signal by the terminal remains unchanged, which avoids loss of signal hopping, reduces index requirements for devices, and reduces the apparatus cost.

Optionally, the SR information is carried by any one of an SR sequence, a DMRS sequence, a specific modulation symbol, and a coded modulation code. The SR signal inserted into the PUSCH resource can adopt the sequence, for example, a ZC sequence, such as the SR sequence and the DMRS sequence in the prior art, and can also adopt a specific modulation symbol, for example, a BPSK symbol representing two states of positive and negative, and can also be coded and modulated, for example, channel coding of small block length in the prior art.

Optionally, a power control strategy of the SR information includes any one of the following strategies:

a SR power control strategy;

a PUSCH power control strategy; and determining a power compensation parameter according to a resource ratio between a frequency domain resource of a SR sent on the PUSCH resource and a frequency domain resource of an initial SR, and performing compensation on the PUSCH power control strategy or the SR power control strategy according to the power compensation parameter.

In this embodiment, the power control strategy of the SR information inserted into the PUSCH can be the SR power control strategy, for example, using the same target power and the same path loss compensation as the SR, etc. The technical advantage is that reliability of the SR information does not change regardless of whether the insertion occurs. The PUSCH power control strategy can also be adopted, for example, using the same target power and the same path loss compensation as the PUSCH, etc. The technical advantage is reduced frequent power adjustments, lower hardware requirements and lower costs. The power compensation parameter can also be determined according to the resource ratio between the frequency domain resource of the SR inserted into the PUSCH resource and the frequency domain resource of the initial SR, and the compensation is performed based on the PUSCH power control strategy or the SR power control strategy. The technical advantage is precise power control, ensuring unchanged reliability of the SR information regardless of whether the insertion occurs.

A basic framework for the uplink power control of the terminal is mainly based on a flexible combination of FPC. On a certain uplink carrier in a given serving cell, FPC mainly includes an open-loop power control part, a closed-loop power control part, and other adjustment amounts. Therefore, to ensure compliance with the power classification of the terminal, the configured transmission power $P_{CMAX}$ (a maximum transmission power allowed by the uplink carrier) of the terminal on the uplink carrier will be used to limit the power value calculated by the FPC. A general calculation formula of the uplink transmission power P (in dBm) is as follows:

$$P=\min[P_{CMAX},\{\text{open-loop operating point}\}+\{\text{closed-loop offset}\}+\{\text{other adjustment amount}\}]$$

For the SR power control strategy and the PUSCH power control strategy, reference can be made to the above-mentioned uplink power control strategy of the terminal, and the parameters thereof can be adjusted according to the conditions of different channel resources so that they conform to the corresponding channel resources.

Further, the SR resource and the PUSCH resource overlapping in the time domain is that the SR resource and the DMRS of the PUSCH resource overlap in the time domain, and sending the SR information on the PUSCH resource includes: sending the SR information at a position of the DMRS of the PUSCH resource.

In this embodiment, when the SR resource and the PUSCH DMRS overlap in the time domain, the method for multiplexing the SR onto the PUSCH resource is similar to the method 1, and the difference lies in the position where the SR is sent. In the method 1, the SR is sent at the position where the SR state is the first state. In this embodiment, the SR information is sent on the SR resource corresponding to the PUSCH DMRS position.

Further, multiplexing the SR information onto the PUSCH resource includes: transmitting the SR information on all preconfigured SR resources, and stopping transmitting data at positions on the PUSCH resource corresponding to SR resources; or sending the SR information at all positions on the PUSCH resource that overlap with the SR resource.

In this embodiment, the method for multiplexing the SR information onto the PUSCH resource is similar to the method 1 and the method 2, and the difference lies in the puncturing position. In the method 1 and the method 2, the punching is performed at the PUSCH resource position corresponding to the position where the SR state is positive, and in this embodiment, the puncturing is performed at the PUSCH resource positions corresponding to all preconfigured SR resources.

Embodiment 3 the SR information is carried through the DMRS

In one of the embodiments, multiplexing the SR information onto the PUSCH resource includes: carrying the SR information in the DMRS of the PUSCH. Optionally, the carrying the SR information in the DMRS of the PUSCH includes: using different DMRS configurations to indicate different SR states.

In this implementation, the SR information can be carried in the DMRS of the PUSCH, and the different SR states can be indicated by the different DMRS configurations. For example, when the SR is in the positive state, a first DMRS configuration is adopted; otherwise, a second DMRS configuration is adopted. The technical advantage is that the SR information is sent to the network device without affecting the normal transmission of the PUSCH.

Further, the DMRS configuration includes at least one of a DMRS port, a DMRS sequence, and a DMRS pattern. Optionally, different DMRS sequences are generated in the same manner, and different DMRS sequences have different initialization factors. Optionally, different DMRS patterns have different time-frequency positions.

In this embodiment, the DMRS configuration may be the DMRS port, the DMRS sequence, or the DMRS pattern. For example, when the SR is in the positive state, a first DMRS port is adopted, otherwise, a second DMRS port is adopted. The first DMRS port may be a DMRS port indicated by the UL grant, or may be configured by the high level layer (especially suitable for a semi-persistently configured PUSCH). The second DMRS port may be a specific port number semi-persistently configured, may also be a semi-persistently configured offset value relative to the first DMRS port, or may be a dynamically configured absolute port or offset value. For example, when the SR is in the positive state, a first DMRS sequence is adopted, otherwise, a second DMRS sequence is adopted. The first DMRS sequence and the second DMRS sequence are generated in the same manner, and only initialization factors of pseudo-random sequences are different. For example, an initialization factor corresponding to the first DMRS sequence is: c_init=f(m_SCID0), and an initialization factor corresponding to the second DMRS sequence is: c_init=f(m_SCID1), where m_SCID0 and m_SCID1 are sequence input parameters, which can be configured semi-persistently or dynamically. For example, when the SR is in the positive state, a first DMRS pattern is adopted, otherwise, a second DMRS pattern is adopted. Time-frequency positions of the first DMRS pattern and the second DMRS pattern are different. For example, the first DMRS pattern occupies a first symbol of the PUSCH, and the second DMRS pattern occupies a second symbol of the PUSCH.

Figure 8A:
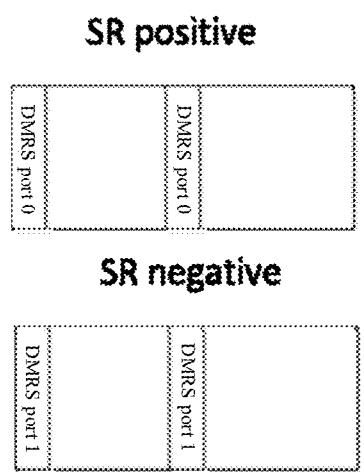
FIG. 8A is a schematic diagram of a DMRS indicating an SR state provided by an embodiment.
Figure 8B:
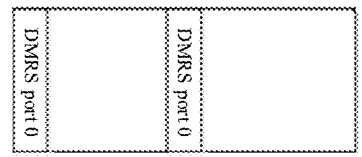
FIG. 8B is schematic diagram of another DMRS indicating an SR state provided by an embodiment.
Figure 8B:
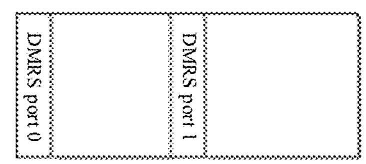

Optionally, the different DMRS configurations include: all DMRS configurations in the PUSCH resource are changed; or, a part of DMRS configurations in the PUSCH resource are changed. As shown in FIG. 8A, the DMRS configuration can be unified change of all DMRS configurations in the PUSCH. As shown in FIG. 8B, it can also be change of a partial area, for example, the DMRS configuration of a first half slot or a second half slot changes.

Further, the number of DMRS configuration states can be two (positive, negative) or more than two, corresponding to the case of multiple SR configurations.

Figure 9A:
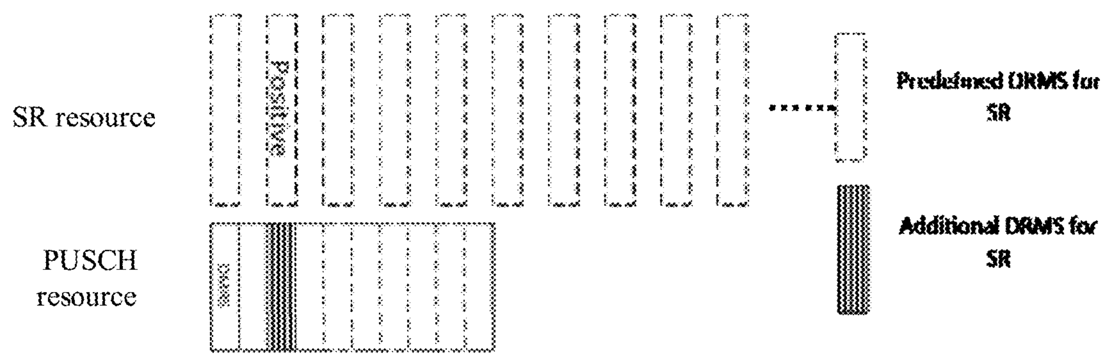
FIGS. 9A and 9B are schematic diagrams of dynamic configuration of a DMRS, respectively.
Figure 9B:
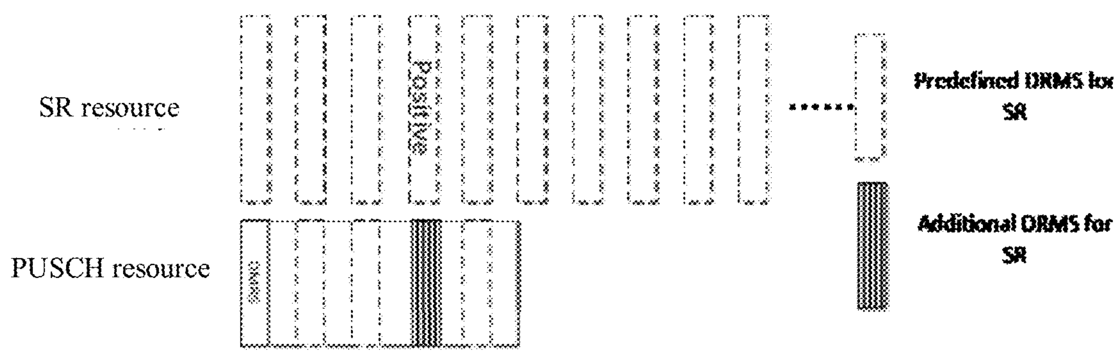

In the above embodiment, the DMRS configurations are different mainly due to different DMRS ports, different DMRS sequences and different DMRS patterns, and the position of the DMRS does not dynamically change. In some scenarios, the position of the DMRS can also be dynamically adjusted to indicate different SR states, and the DMRS configuration will change as the SR state changes during the PUSCH transmission. The technical advantage is that the SR can also be sent to the network in time during PUSCH transmission. The DMRS configuration method is similar to the foregoing embodiments, therefore, only the feature of dynamically configuring the DMRS position is described in detail here. As shown in FIG. 9A and FIG. 9B, the DMRS is sent at the predefined DRMS position after the SR positive, and the DRMS positions corresponding to the SR positive at different positions are also different.

It should be noted that in the above embodiments 2 and 3, the terminal knows the SR state and can directly determine the method for multiplexing the SR information onto the PUSCH resource. For the network side, the network-side device does not know the SR state, and accordingly, the network-side device needs to blindly detect the transmission modes corresponding to different SR states, and then determine the method for multiplexing the SR information onto the PUSCH resource.

It should be understood that although steps in the flowchart of FIG. 3A or 4 are illustrated in sequence as indicated by arrows, the steps are not necessarily performed in the sequence indicated by the arrows. The performing order of the steps are not strictly limited and the steps may be performed in other orders, unless explicitly stated herein. Furthermore, at least part of the steps in FIG. 3A or 4 may include sub-steps or stages, which are not necessarily performed at the same time and may be performed at different time points. The performing order of these sub-steps or stages is not necessarily sequential, and may be performed in turn or alternately with at least part of other steps or the sub-steps or stages of the other steps.

Figure 10:
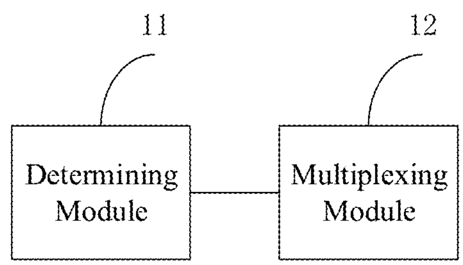
FIG. 10 is a block diagram of an information transmission device provided by an embodiment.

In an embodiment, as shown in FIG. 10, there is provided an information transmission device, which may be disposed in a terminal, and includes:

a determining module 11, configured to determine a scheduling request (SR) resource and a physical uplink shared channel (PUSCH) resource according to control signaling sent by a network-side device, where the SR resource is a physical uplink control channel (PUCCH) resource carrying SR information; and a multiplexing module 12, configured to multiplex the SR information onto the PUSCH resource if the SR resource and the PUSCH resource overlap in a time domain and the SR resource and/or the PUSCH resource satisfy a preset condition.

In an embodiment, there is also provided an information transmission device, a structure of which is the same as that shown in FIGS. 9A and 9B. The device can be disposed in a network-side device and includes:

a determining module 11, configured to determine a SR resource and a PUSCH resource, where the SR resource is a PUCCH resource carrying SR information; and a multiplexing module 12, configured to multiplex the SR information onto the PUSCH resource if the SR resource and the PUSCH resource overlap in a time domain and the SR resource and/or the PUSCH resource satisfy a preset condition.

In one of the embodiments, the preset condition includes a configured multiplexing rule by the network-side device or a preset multiplexing rule.

In one of the embodiments, the configured multiplexing rule by the network-side device includes:

the terminal receives a semi-persistent signaling sent by the network-side device, and the semi-persistent signaling is used to indicate the terminal to multiplex the SR information onto the PUSCH resource.

In one of the embodiments, the preset multiplexing rule includes at least one of the following:

a transmission priority of the SR resource and the PUSCH resource satisfies a preset priority condition;

the SR resource satisfies a transmission priority requirement, and a length of the PUSCH resource is less than a preset threshold;

the SR resource satisfies the transmission priority requirement, and an end position of the PUSCH resource is at or before a preset position; and a transmission configuration of the SR resource and a transmission configuration of the PUSCH resource satisfy a preset configuration condition.

In one of the embodiments, the method further includes: discarding the SR and transmitting data on the PUSCH resource if the SR resource and/or the PUSCH resource do not satisfy the preset condition.

In one of the embodiments, multiplexing the SR information onto the PUSCH resource includes:

transmitting the SR information on the PUSCH resource, where the SR information is carried by bits of a preset length.

In one of the embodiments, the preset length is a length determined according to the number of target SR configurations.

In one of the embodiments, the preset length being the length determined according to the number of the target SR configurations includes:

N=log 2(M+1), or N=M; where N is the preset length, and M is the number of the target SR configurations.

In one of the embodiments, the number of the target SR configurations is any of the following cases:

the number of the target SR configurations is a total number of SR configurations;

the number of the target SR configurations is the number of SR configurations that overlap with an entire PUSCH resource;

the number of the target SR configurations is the number of SR configurations that overlap with part of the PUSCH resource.

In one of the embodiments, the part of the PUSCH resource is a first half of the PUSCH resource.

In one of the embodiments, the part of the PUSCH resource is a resource for uplink control information (UCI) multiplexing.

In one of the embodiments, multiplexing the SR information onto the PUSCH resource includes: transmitting the SR information on the SR resource, and stopping transmitting data at a position on the PUSCH resource corresponding to the SR resource, if a SR state is a first state; and normally transmitting the data at the position on the PUSCH resource corresponding to the SR resource if the SR state is a second state.

In one of the embodiments, the SR resource and the PUSCH resource overlapping in the time domain is that the SR resource and a demodulation reference signal (DMRS) of the PUSCH resource overlap in the time domain, and multiplexing the SR information onto the PUSCH resource includes at least one of the following methods:

sending the DMRS of the PUSCH resource without sending the SR, where the DMRS does not contain the SR information;

sending the DMRS of the PUSCH resource without sending the SR, where the DMRS contains the SR information;

sending the DMRS of the PUSCH resource, and postponing sending the SR according to a preset number of symbols; and not sending the DMRS of the PUSCH resource, and sending the SR.

In one of the embodiments, multiplexing the SR information onto the PUSCH resource includes: sending the SR information on the PUSCH resource if a SR state is a first state; and normally transmitting the data on the PUSCH resource if the SR state is a second state.

In one of the embodiments, the SR information is carried by any one of an SR sequence, a DMRS sequence, a specific modulation symbol, and a coded modulation code.

In one of the embodiments, a power control strategy of the SR information includes any one of the following strategies: a SR power control strategy; a PUSCH power control strategy; determining a power compensation parameter according to a resource ratio between a frequency domain resource of a SR sent on the PUSCH resource and an initial SR frequency domain resource, and performing compensation on the PUSCH power control strategy or the SR power control strategy according to the power compensation parameter.

In one of the embodiments, the SR resource and the PUSCH resource overlapping in the time domain is that the SR resource and the DMRS of the PUSCH resource overlap in the time domain, and sending the SR information on the PUSCH resource includes: sending the SR information at a position of the DMRS of the PUSCH resource.

In one of the embodiments, multiplexing the SR information onto the PUSCH resource includes: transmitting the SR information on all preconfigured SR resources, and stopping transmitting data at positions on the PUSCH resource corresponding to the SR resources.

In one of the embodiments, multiplexing the SR information onto the PUSCH resource includes: sending the SR information at all positions on the PUSCH resource that overlap with the SR resource.

In one of the embodiments, multiplexing the SR information onto the PUSCH resource includes: carrying the SR information in the DMRS of the PUSCH.

In one of the embodiments, carrying the SR in the DMRS of the PUSCH includes: using different DMRS configurations to indicate different SR states.

In one of the embodiments, the DMRS configuration includes at least one of a DMRS port, a DMRS sequence, and a DMRS pattern.

In one of the embodiments, different DMRS sequences are generated in the same manner, and different DMRS sequences have different initialization factors.

In one of the embodiments, different DMRS patterns have different time-frequency positions.

In one of the embodiments, the different DMRS configurations include that all DMRS configurations in the PUSCH resource are changed; or, a part of DMRS configurations in the PUSCH resource are changed.

An implementation principle and technical effect of the information transmission device provided by the foregoing embodiments are similar to those of the foregoing method embodiments, and will not be repeated here.

For specific limitations on the information transmission device, please refer to the above limitations on the information transmission method, which will not be repeated here. Modules in the above information transmission device can be implemented all or in part by software, hardware, and a combination thereof. The above modules can be embedded or independent of the processor in the computer device in the form of hardware, or can be stored in the memory of the computer device in the form of software, so that the processor calls and executes the corresponding operations of the above modules.

Figure 11:
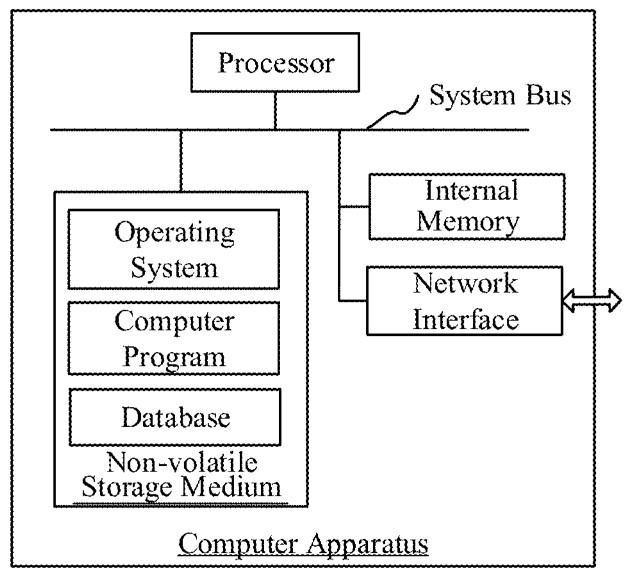
FIG. 11 is a block diagram of a computer apparatus provided by an embodiment.

In an embodiment, there is provided a computer apparatus, which may be the terminal or the network-side device, and its internal structure diagram may be as shown in FIG. 11. The computer apparatus includes a processor, a memory, a network interface and a database which are connected through a system bus. The processor of the computer apparatus is configured to provide computing and control capabilities. The memory of the computer apparatus includes a non-volatile storage medium and an internal memory. The non-volatile storage medium stores an operating system, a computer program and a database. The internal memory provides an operation environment for the operating system and the computer program in the non-volatile storage medium. The database of the computer apparatus is configured to store information transmission data. The network interface of the computer apparatus is configured to communicate with an external terminal through a network connection. The computer program is executed by the processor to implement the information transmission method.

It can be appreciated by those skilled in the art that the structure shown in FIG. 11 is only a block diagram of a part of the structure that is related to the solutions of the present application, and does not constitute a limitation on the computer apparatus to which the solutions of the present application can be applied. A specific computer apparatus may include more or less components than those shown in the figure, or some components can be combined, or a different arrangement of the components can be provided.

In an embodiment, there is provided a computer device, including a memory and a processor, a computer program is stored in the memory, and the processor implements the following steps when executing the computer program:

determining a scheduling request (SR) resource and a physical uplink shared channel (PUSCH) resource according to control signaling sent by a network-side device, where the SR resource is a physical uplink control channel (PUCCH) resource carrying SR information; and multiplexing the SR information onto the PUSCH resource if the SR resource and the PUSCH resource overlap in a time domain and the SR resource and/or the PUSCH resource satisfy a preset condition.

In an embodiment, there is provided a computer apparatus, including a memory and a processor, and a computer program is stored in the memory, and the processor implements the following steps when executing the computer program:

determining a SR resource and a PUSCH resource, where the SR resource is a PUCCH resource carrying SR information; and multiplexing the SR information onto the PUSCH resource if the SR resource and the PUSCH resource overlap in a time domain and the SR resource and/or the PUSCH resource satisfy a preset condition.

An implementation principle and technical effect of the computer apparatus provided by the foregoing embodiments are similar to those of the foregoing method embodiments, and will not be repeated here.

In an embodiment, there is provided a computer-readable storage medium having a computer program stored thereon, and the computer program, when executed by a processor, implements the following steps:

determining a scheduling request (SR) resource and a physical uplink shared channel (PUSCH) resource according to control signaling sent by a network-side device, where the SR resource is a physical uplink control channel (PUCCH) resource carrying SR information; and multiplexing the SR information onto the PUSCH resource if the SR resource and the PUSCH resource overlap in a time domain and the SR resource and/or the PUSCH resource satisfy a preset condition.

In an embodiment, there is provided a computer-readable storage medium having a computer program stored thereon, and the computer program, when executed by a processor, implements the following steps:

determining, by a network-side device, a SR resource and a PUSCH resource, where the SR resource is a PUCCH resource carrying SR information; and multiplexing the SR information onto the PUSCH resource if the SR resource and the PUSCH resource overlap in a time domain and the SR resource and/or the PUSCH resource satisfy a preset condition.

The foregoing embodiment provides the computer-readable storage medium, and its implementation principle and technical effect are similar to those of the foregoing method embodiments, and will not be repeated here.

Those skilled in the art may understand that all or part of the procedures for implementing the above method embodiments may be completed by a computer program to instruct related hardware. The computer program may be stored in a non-volatile computer-readable storage medium. When the computer program is executed, the procedures of the above method embodiments are included. Any reference to the memory, the storage, the database, or other media used in the embodiments provided in the present application may include a non-volatile and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration, rather than limitation, the RAM is available in a variety of forms such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct memory bus dynamic RAM (DRDRAM), and a memory bus dynamic RAM (RDRAM).

The various technical features of the above embodiments can be combined arbitrarily. For the purpose of conciseness, not all possible combinations of the technical features in the above embodiments are described. However, any combination of these technical features, provided that they do not conflict, is considered to be encompassed by the scope of the present application. In the above embodiments, only several implementations of the present application are described more specifically and in more detail, but they cannot be thus understood as limitations on the scope of the present application. It is to be pointed out that those of ordinary skill in the art may also make variations and improvements without departing from the concept of the present application, which fall within the scope of protection of the present application. Therefore, the scope of protection of the present application should be determined by the appended claims.

What is claimed is:

1. An information transmission method, comprising:

determining, by a terminal, a scheduling request (SR) resource and a physical uplink shared channel (PUSCH) resource according to control signaling sent by a network-side device, wherein the SR resource is a physical uplink control channel (PUCCH) resource carrying SR information; and multiplexing the SR information onto the PUSCH resource in a case where the SR resource and the PUSCH resource overlap in a time domain and the SR resource and/or the PUSCH resource satisfy a preset condition, wherein the multiplexing the SR information onto the PUSCH resource comprises:

transmitting the SR information on all preconfigured SR resources, and stopping transmitting data at positions on the PUSCH resource that correspond to the SR resources.

2. The method according to claim 1, wherein the preset condition comprises a multiplexing rule configured by the network-side device and/or a preset multiplexing rule, wherein the multiplexing rule configured by the network-side device comprises that:

the terminal receives a semi-persistent signaling sent by the network-side device, wherein the semi-persistent signaling is used to indicate the terminal to multiplex the SR information onto the PUSCH resource, or wherein the preset multiplexing rule comprises at least one of the following:

a transmission priority of the SR resource and the PUSCH resource satisfies a preset priority condition;

the SR resource satisfies a transmission priority requirement, and a length of the PUSCH resource is less than or equal to a preset threshold;

the SR resource satisfies the transmission priority requirement, and an end position of the PUSCH resource is at or before a preset position; and a transmission configuration of the SR resource and a transmission configuration of the PUSCH resource satisfy a preset configuration condition.

3. The method according to claim 1, wherein the multiplexing the SR information onto the PUSCH resource comprises:

transmitting the SR information on the PUSCH resource, wherein the SR information is carried by bits with a preset length, wherein the preset length is a length determined according to a number of target SR configurations.

4. The method according to claim 3, wherein the number of target SR configurations is any of the following cases:

the number of the target SR configurations is a total number of SR configurations;

the number of the target SR configurations is a number of SR configurations that overlap with an entire PUSCH resource; and the number of the target SR configurations is a number of SR configurations that overlap with part of the PUSCH resource, wherein the part of the PUSCH resource is a first half of the PUSCH resource, or wherein the part of the PUSCH resource is a resource for uplink control information (UCI) multiplexing.

5. The method according to claim 1, wherein the multiplexing the SR information onto the PUSCH resource comprises:

transmitting the SR information on the SR resource and stopping transmitting data at a position on the PUSCH resource corresponding to the SR resource in a case where a SR state is a first state; and normally transmitting the data at the position on the PUSCH resource corresponding to the SR resource in a case where the SR state is a second state.

6. The method according to claim 1, wherein the SR resource and the PUSCH resource overlapping in the time domain is that the SR resource and a demodulation reference signal (DMRS) of the PUSCH resource overlap in the time domain, and the multiplexing the SR information onto the PUSCH resource comprises at least one of the following methods:

sending the DMRS of the PUSCH resource and not sending the SR, wherein the DMRS does not include the SR information;

sending the DMRS of the PUSCH resource and not sending the SR, wherein the DMRS includes the SR information;

sending the DMRS of the PUSCH resource, and postponing sending the SR according to a preset number of symbols; and not sending the DMRS of the PUSCH resource, and sending the SR.

7. The method according to claim 1, wherein the multiplexing the SR information onto the PUSCH resource comprises:

sending the SR information on the PUSCH resource in a case where a SR state is a first state; and normally transmitting data on the PUSCH resource in a case where the SR state is a second state.

8. An information transmission method, comprising:

determining, by a network-side device, a SR resource and a PUSCH resource, wherein the SR resource is a PUCCH resource carrying SR information; and receiving the SR information multiplexed onto the PUSCH resource in a case where the SR resource and the PUSCH resource overlap in a time domain and the SR resource and/or the PUSCH resource satisfy a preset condition, wherein the SR information is transmitted on all preconfigured SR resources and data is not transmitted at positions on the PUSCH resource that correspond to the SR resources.

9. The method according to claim 8, wherein the preset condition comprises a multiplexing rule configured by the network-side device or a preset multiplexing rule, wherein the multiplexing rule configured by the network-side device comprises:

a terminal receives a semi-persistent signaling sent by the network-side device, wherein the semi-persistent signaling is used to indicate the terminal to multiplex the SR information onto the PUSCH resource, or wherein the preset multiplexing rule comprises at least one of the following:

a transmission priority of the SR resource and the PUSCH resource satisfies a preset priority condition;

the SR resource satisfies a transmission priority requirement, and a length of the PUSCH resource is less than a preset threshold;

the SR resource satisfies the transmission priority requirement, and an end position of the PUSCH resource is at or before a preset position; and a transmission configuration of the SR resource and a transmission configuration of the PUSCH resource satisfy a preset configuration condition.

10. The method according to claim 8, wherein the multiplexing the SR information onto the PUSCH resource comprises:

transmitting the SR information on the PUSCH resource, wherein the SR information is carried by bits with a preset length, wherein the preset length is a length determined according to a number of target SR configurations.

11. The method according to claim 10, wherein the number of the target SR configurations is any of the following cases:

the number of the target SR configurations is a total number of SR configurations;

the number of the target SR configurations is a number of SR configurations that overlap with an entire PUSCH resource; and the number of the target SR configurations is a number of SR configurations that overlap with part of the PUSCH resource, wherein the part of the PUSCH resource is a first half of the PUSCH resource, or wherein the part of the PUSCH resource is a resource for uplink control information (UCI) multiplexing.

12. The method according to claim 8, wherein the multiplexing-the SR information onto the PUSCH resource comprises:

transmitting the SR information on the SR resource and stopping transmitting data at a position on the PUSCH resource corresponding to the SR resource in a case where a SR state is a first state; and normally transmitting the data at the position on the PUSCH resource corresponding to the SR resource in a case where the SR state is a second state.

13. The method according to claim 8, wherein the SR resource and the PUSCH resource overlapping in the time domain is that the SR resource and a demodulation reference signal (DMRS) of the PUSCH resource overlap in the time domain, and the multiplexing the SR information onto the PUSCH resource comprises at least one of the following methods:

sending the DMRS of the PUSCH resource and not sending the SR, wherein the DMRS does not include the SR information;

sending the DMRS of the PUSCH resource and not sending the SR, wherein the DMRS includes the SR information;

sending the DMRS of the PUSCH resource, and postponing sending the SR according to a preset number of symbols; and not sending the DMRS of the PUSCH resource, and sending the SR.

14. The method according to claim 8, wherein the multiplexing the SR information onto the PUSCH resource comprises:

sending the SR information on the PUSCH resource in a case where a SR state is a first state; and normally transmitting data on the PUSCH resource in a case where the SR state is a second state.

15. The method according to claim 8, wherein the method further comprises:

blindly detecting the SR state by the network-side device.

16. An information transmission device, comprising:

a memory configured to store a computer program; and a processor, configured to execute the computer program to determine a scheduling request (SR) resource and a physical uplink shared channel (PUSCH) resource according to control signaling sent by a network-side device, wherein the SR resource is a physical uplink control channel (PUCCH) resource carrying SR information; and a transceiver, configured to multiplex the SR information onto the PUSCH resource in a case where the SR resource and the PUSCH resource overlap in a time domain and the SR resource and/or the PUSCH resource satisfy a preset condition, wherein the transmitter is configured to transmit the SR information on all preconfigured SR resources, and stop transmitting data at positions on the PUSCH resource that correspond to the SR resources.

17. An information transmission device, comprising:

a memory configured to store a computer program; and a processor, configured to execute the computer program to determine a SR resource and a PUSCH resource, wherein the SR resource is a PUCCH resource carrying SR information; and a transceiver, configured to receive the SR information multiplexed onto the PUSCH resource in a case where the SR resource and the PUSCH resource overlap in a time domain and the SR resource and/or the PUSCH resource satisfy a preset condition, wherein the SR information is transmitted on all preconfigured SR resources and data is not transmitted at positions on the PUSCH resource that correspond to the SR resources.

* * * * *